United States Patent
Gallardo (10) Patent No.: US 11,150,082 B2
(45) Date of Patent: Oct. 19, 2021

(54) OPTICAL SHAPE SENSOR FOR DETERMINING SHAPE OF A FLEXIBLE SUBSTRATE

(71) Applicant: Sharp Kabushiki Kaisha, Osaka (JP)

(72) Inventor: Diego Gallardo, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 310 days.

(21) Appl. No.: 16/444,236

(22) Filed: Jun. 18, 2019

(65) Prior Publication Data

US 2020/0400426 A1     Dec. 24, 2020

(51) Int. Cl.
     *G01B 11/16*      (2006.01)
     *G01D 5/34*      (2006.01)
     *G02B 6/42*      (2006.01)

(52) U.S. Cl.
     CPC ............... *G01B 11/16* (2013.01); *G01D 5/34* (2013.01); *G02B 6/425* (2013.01)

(58) Field of Classification Search
     CPC ....... G01B 11/16; G01B 11/24; G01B 11/245; G01D 5/24; G01D 5/32; G01D 5/35338; G01D 5/35341; G01D 5/35345; G01D 5/3537; G01D 5/35374; G01D 5/3538; G02B 6/425; G02B 6/4249; G02B 6/42
See application file for complete search history.

(56) References Cited

U.S. PATENT DOCUMENTS

| | | | | |
|---|---|---|---|---|
| 7,630,591 | B2 * | 12/2009 | Allen | G01M 11/086 385/12 |
| 10,162,107 | B2 * | 12/2018 | Pare | G01J 3/36 |
| 10,488,916 | B2 * | 11/2019 | Hahami | A61B 5/112 |
| 2003/0044155 | A1 * | 3/2003 | Maiden | D03D 3/02 385/137 |
| 2011/0302694 | A1 * | 12/2011 | Wang | A61B 5/103 2/160 |
| 2011/0310634 | A1 * | 12/2011 | Nagafuji | G02B 6/125 362/610 |
| 2013/0266258 | A1 * | 10/2013 | Hallstein | G02B 6/10 385/27 |
| 2013/0296000 | A1 * | 11/2013 | Park | G06F 3/0482 455/566 |
| 2014/0028597 | A1 * | 1/2014 | Cho | G06F 3/04842 345/173 |

(Continued)

*Primary Examiner* — John R Lee
(74) *Attorney, Agent, or Firm* — Renner, Otto, Boisselle & Sklar, LLP (57) ABSTRACT

A shape sensor employs light guide technology to determine curvature of a flexible substrate to which the shape sensor is applied. The shape sensor includes a flexible two-dimensional lattice of first light guides that extend in a first direction and second light guides that extend in a second direction that intersects with the first direction. The light guides include a core having a refractive index that is greater than a refractive index of a cladding material in which the light guides are embedded, and intersect at intersecting core regions at which crosstalk of light travel occurs between the first light guides and the second light guides. A controller transmits excitation control signals to light sources of the light guides and reads output signals from photodetectors. The controller further determines a curvature of the shape sensor based on the output signals read from the photodetectors.

20 Claims, 8 Drawing Sheets

(56) References Cited

U.S. PATENT DOCUMENTS

| | | | |
|---|---|---|---|
| 2015/0091875 A1* | 4/2015 | Li | G06F 3/045 |
| | | | 345/176 |
| 2015/0103051 A1* | 4/2015 | Wyrwas | G06F 3/0421 |
| | | | 345/175 |
| 2016/0089031 A1* | 3/2016 | Hu | A61B 5/0205 |
| | | | 600/480 |
| 2018/0214026 A1* | 8/2018 | Goodall | A61B 5/0091 |
| 2018/0265937 A1* | 9/2018 | Duer | G01N 33/54373 |
| 2018/0297214 A1* | 10/2018 | Lessing | G01T 7/00 |
| 2020/0093404 A1* | 3/2020 | Kim | A61B 5/6847 |
| 2020/0271737 A1* | 8/2020 | Gallardo | H01F 38/14 |
| 2020/0340871 A1* | 10/2020 | Kwon | G01D 5/35351 |
| 2020/0400426 A1* | 12/2020 | Gallardo | G06F 1/1677 |
| 2021/0041227 A1* | 2/2021 | Mark | G02B 6/262 |

\* cited by examiner

OPTICAL SHAPE SENSOR FOR DETERMINING SHAPE OF A FLEXIBLE SUBSTRATE

TECHNICAL FIELD

The present application relates generally to determining the spatial configuration of a flexible substrate and, more particularly, to systems for determining the spatial configuration of a flexible substrate using an optical shape sensor, which for example may be employed to measure the shape of a flexible display device.

BACKGROUND ART

Current advances in display technology relate to flexible displays that have a high degree of substrate flexibility. The substrate shape of a flexible display provides a new interface for user input and the potential for new display modes. For example, a device may determine a deviation of the display substrate from a flat plane and take action in response to the deviation. Some conventional flexible displays use sensors such as piezoelectric sensors, magnetic sensors, and the like at the edges of a display panel to detect the current substrate shape. Other conventional flexible displays may position sensors at display hinges, and the sensors are limited to determining the current substrate shape along a single axis associated with the hinge. Such conventional systems, however, do not provide a precise indication of the current substrate shape.

SUMMARY OF INVENTION

Accordingly, there is a need in the art for improved methods and systems for determining the spatial configuration of a flexible substrate that detects deviations of the substrate from a flat plane, and in particular that detects precise, local deviations of the substrate from a flat plane. The present application relates to an optical shape sensor that is capable of detecting localized deflections and deviations of a flexible substrate from a flat plane.

An optical shape sensor in accordance with embodiments of the present application includes a two-dimensional (2D) lattice of intersecting light guides that are comparable to optical fibers. Each light guide has a light source at a first end, and a photodetector at a second end opposite from the first end. Each light guide conducts the light from the light source to the photodetector. When the light guides are in a straight configuration, total internal reflection (TIR) at interfaces of a light guide core of the sensor with a cladding material or layer prevents light from escaping out of the optical shape sensor. Light is scattered at the core/cladding interfaces, and within the core, the scattering allows crosstalk between the different light guides at each intersection of such different light guides. Bending of the sensor plane results in a frustrated TIR (FTIR) on some locations of the sensor, and/or changes in the crosstalk couplings at the light guide intersections. These in turn result in a change in the signal at the photodetectors. A controller is configured to determine a shape of the sensor from signals generated by the set of photodetectors, as the signals from the set of photodetectors will vary based upon a degree, direction, and positioning of deflection or deviation of the light guides relative to a straight state.

An aspect of the invention, therefore, is a shape sensor that employs light guide technology to determine a degree, positioning, and direction of curvature of a flexible substrate to which the shape sensor is applied. In exemplary embodiments, the shape sensor includes a flexible two-dimensional lattice of a plurality of first light guides that extend in a first direction and a plurality of second light guides that extend in a second direction that intersects with the first direction; each of the light guides of the two-dimensional lattice including a light source at a first end of the light guide and a photodetector at a second end of the light guide opposite from the first end; and a flexible cladding material in which the two-dimensional lattice of first and second light guides is embedded. Each of the light guides of the two-dimensional lattice includes a core having a refractive index that is greater than a refractive index of the cladding material. The first light guides and the second light guides intersect at intersecting core regions at which crosstalk of light travel occurs between the first light guides and the second light guides. The shape sensor may be connected in signal communication to a controller configured to transmit excitation control signals to the light sources and read output signals from the photodetectors. The controller further is configured to determine a curvature of the shape sensor based on the output signals read from the photodetectors.

In other exemplary embodiments, the shape sensor includes a flexible continuous-slab light guide having a continuous core material; a flexible cladding substrate that surrounds the continuous core material, wherein a refractive index of the continuous core material is greater than a refractive index of the cladding substrate; a plurality of light sources; and a plurality of photodetectors. The plurality of light sources and the plurality of photodetectors respectively are located on opposite sides of the continuous core material.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Embodiments of the present invention will now be described with reference to the drawings, wherein like reference numerals are used to refer to like elements throughout. It will be understood that the figures are not necessarily to scale.

Embodiments of the present application provide for improved methods and systems for determining the spatial configuration of a flexible substrate that detects deviations of the substrate from a flat plane, and in particular that detects precise, local deviations of the substrate from a flat plane. The present application relates to an optical shape sensor that is capable of detecting localized deflections and deviations of a flexible substrate from a flat plane. The optical shape sensor relies on light guide technology, comparable to optical fibers, as a basis for detecting such localized deflections and deviations of a flexible substrate from a flat plane.

Figure 1:
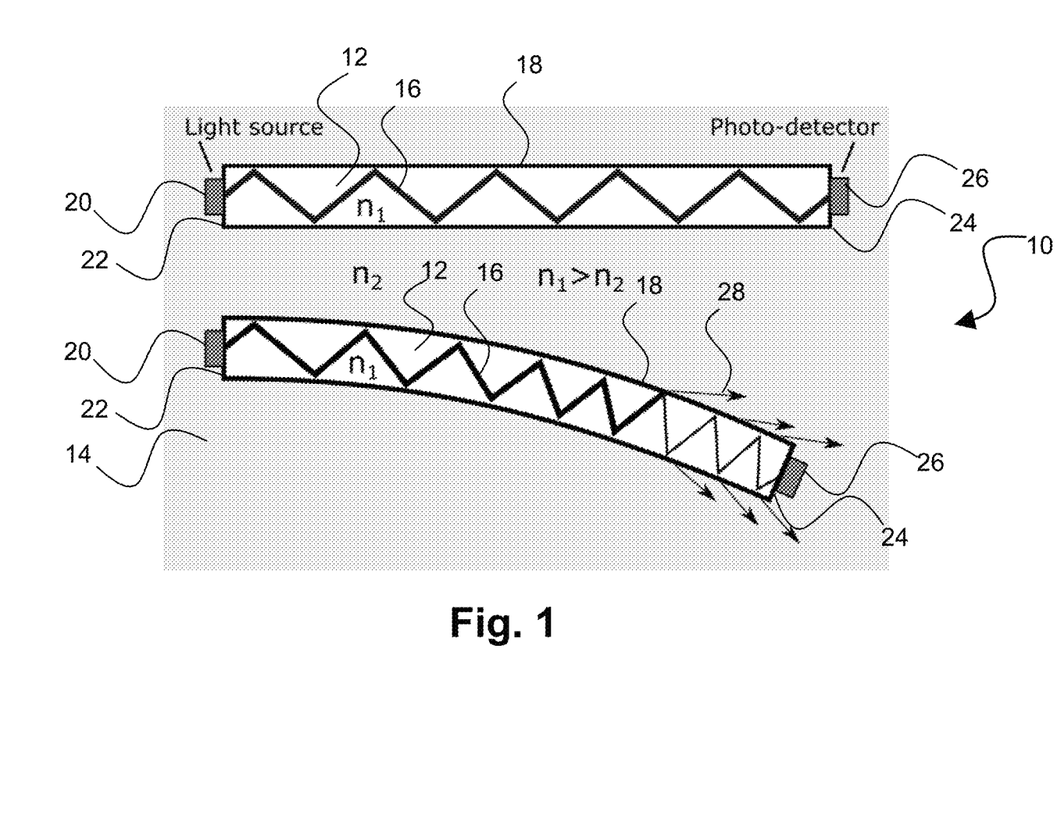
FIG. 1 is a drawing depicting operation of an exemplary light guide, illustrating the difference in internal reflection for a straight light guide versus a curved or bent light guide.

FIG. 1 is a drawing depicting operation of an exemplary light-guide 10, illustrating the difference in internal reflection for a straight light guide versus a bent light guide. A light guide 10 includes of a transparent medium 12 of a first refractive index n1, also referred to as the light guide core 12, embedded in a surrounding medium 14 of a second refractive index n2 different from the first refractive index, also referred to as the light guide cladding material 14, whereby n1>n2. For light rays 16 traveling within the core 12 toward the cladding material 14, those light rays incident at the core/cladding interface 18 with an angle of incidence $$\theta_1 \geq \operatorname{asin}\left(\frac{n_2}{n_1}\right)$$

get reflected back into the core 12. For a straight light guide configured comparably as illustrated in FIG. 1, essentially all light meets the angular condition for reflection, and thus the light remains within the core 12 being reflected back and forth between the interfaces 18 with the cladding material 14. This is known as total internal reflection (TIR) as illustrated in the top portion of FIG. 1, and is the basis for optical fiber technology. A light guide uses this principle to convey light from a light source 20 at a first end 22 of the light guide to a second end 24 of the light guide opposite from the first end. As shown in FIG. 1, the light that has travelled from the first end of the light guide to the second end may be detected by a photodetector 26.

Figure 2:
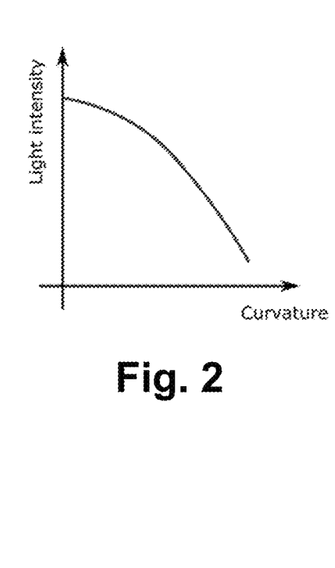
FIG. 2 is a graph depicting an exemplary relationship of light intensity that experiences internal reflection as a function of curvature of the light guide.

As shown in the bottom portion of FIG. 1, when the light guide 10 is bent or curved, some of the light rays 16 that previously would have undergone TIR no longer satisfy the angle of incidence condition for reflection, and hence will not be totally reflected within the core 12. Accordingly, a portion of the light rays 28 escapes the from the core 12 and travels into the cladding material 14. As a result, the light intensity detected at the photodetector 26 will be diminished as to the bent or curved light guide relative to the light intensity detected for the straight light guide. FIG. 2 is a graph depicting an exemplary relationship of detected light intensity at the photodetector as a function of curvature of the light guide. As seen in FIG. 2, as the light guide curvature increases, the detected light intensity decreases as a larger proportion of the light rays escapes the light guide core. Based on FIG. 2 or comparable relationship, an electronic controller may establish a bijective relationship between the curvature of the light guide and the signal loss at the photodetector as the light intensity decreases with increased curvature. In this manner, the controller can quantify the light guide curvature based upon a light detection signal that the controller receives from the photodetector.

Figure 3A:
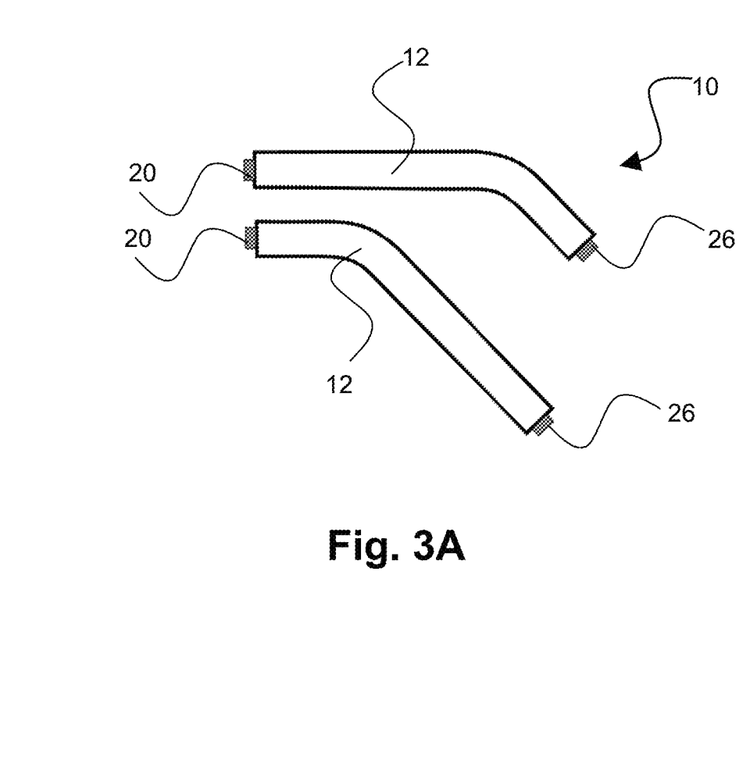
FIG. 3A and FIG. 3B are drawings illustrating a difference between curvature and shape using an example of the light guide of FIG. 1.
Figure 3B:
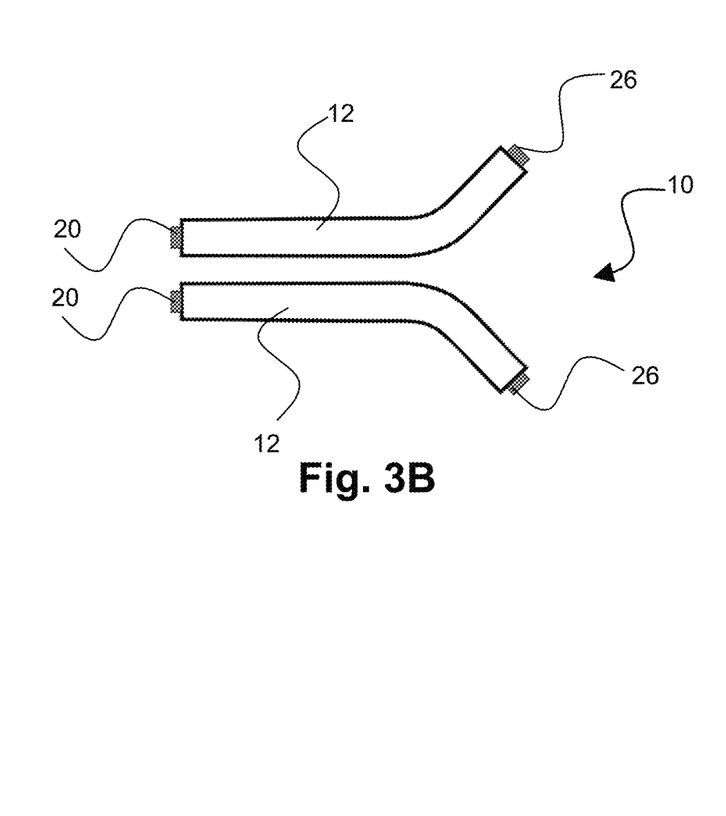

Although light guide curvature may be quantified in such manner, light guide curvature does not equate specifically to light guide shape. FIG. 3A is a drawing illustrating a difference between curvature and shape using an example of the light guide 10 of FIG. 1. The two configurations of the light guide 10 in FIG. 3A have the same overall curvature, and thus the photodetector 26 would detect the same light intensity or signal level for both configurations. The two configurations, however, have a different shape in that the location of the curvature differs in each configuration. The bijective relationship of light intensity and curvature, therefore, is insufficient to detect the precise light guide shape. FIG. 3B is another drawing that depicts the difference between light guide curvature and shape. The two configurations of the light guide 10 in FIG. 3B also have the same overall curvature, although the curvature extends in opposite directions in the two configurations. In this circumstance also, the photodetector 26 would detect the same light intensity or signal level for both configurations. The two configurations, however, again have a different shape in that the direction of the curvature differs in each configuration. For this second example also, the bijective relationship of light intensity and curvature is insufficient to detect the precise light guide shape.

As referenced above, embodiments of the present application relate to an optical shape sensor that employs light guide technology as a basis for detecting localized deflections and deviations of a flexible substrate from a flat plane. Because the bijective relationship of light intensity versus curvature of FIGS. 3A and 3B cannot determine specific light guide shape, a more complex sensor arrangement is described to determine shape in the context of an optical shape sensor.

An optical shape sensor in accordance with embodiments of the present application includes a two-dimensional (2D) lattice of intersecting light-guides that are comparable to optical fibers. Each light guide has a light source at a first end, and a photodetector at a second end opposite from the first end. Each light guide conducts the light from the light source to the photodetector. When the light guides are in a straight configuration, total internal reflection (TIR) at interfaces of a light guide core of the sensor with a cladding material or layer prevents light from escaping out of the optical shape sensor. Light is scattered at the core/cladding interfaces, and within the core, the scattering allows crosstalk between the different light guides at each intersection of such different light guides. Bending of the sensor plane results in a frustrated TIR (FTIR) on some locations of the sensor, and/or changes in the crosstalk couplings at the light guide intersections. These in turn result in a change in the signal at the photodetectors. A controller is configured to determine a shape of the sensor from signals generated by the set of photodetectors, as the signals from the set of photodetectors will vary based upon a degree, positioning, and direction of deflection or deviation of the light guides relative to a straight state.

An aspect of the invention, therefore, is a shape sensor that employs light guide technology to determine a degree, positioning, and direction of curvature of a flexible substrate to which the shape sensor is applied. In exemplary embodiments, the shape sensor includes a flexible two-dimensional lattice of a plurality of first light guides that extend in a first direction and a plurality of second light guides that extend in a second direction that intersects with the first direction; each of the light guides of the two-dimensional lattice including a light source at a first end of the light guide and a photodetector at a second end of the light guide opposite from the first end; and a flexible cladding material in which the two-dimensional lattice of first and second light guides is embedded. Each of the light guides of the two-dimensional lattice includes a core having a refractive index that is greater than a refractive index of the cladding material. The first light guides and the second light guides intersect at intersecting core regions at which crosstalk of light travel occurs between the first light guides and the second light guides. The shape sensor may be connected in signal communication to a controller configured to transmit excitation control signals to the light sources and read output signals from the photodetectors. The controller further is configured to determine a curvature of the shape sensor based on the output signals read from the photodetectors.

Figure 4:
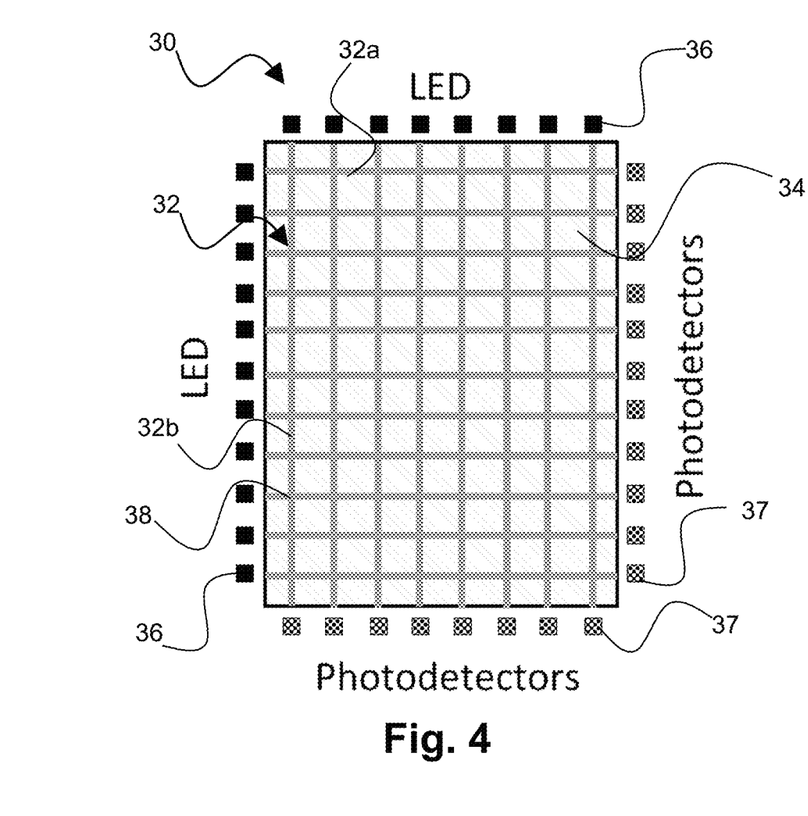
FIG. 4 is a drawing depicting an exemplary optical shape sensor in accordance with embodiments of the present application.

FIG. 4 is a drawing depicting an exemplary optical shape sensor 30 in accordance with embodiments of the present application. The optical shape sensor 30 includes a flexible 2D lattice of intersecting light guides 32 embedded within a flexible cladding material 34. Similarly as described above, the light guides 32 each may include a core material that has a first refractive index n1 greater than a second refractive index n2 of the cladding material, such that reflection of light rays traveling within the light guide cores experience reflection at the core/cladding interfaces when the light rays satisfy the angle of incidence condition. Each light guide 32 further includes a light source 36 at a first end and a photodetector 37 at a second end opposite from the first end.

The 2D lattice of intersecting light guides 32 includes a set of first light guides 32a (horizontal in the figure) that intersects with a set of second light guides 32b (vertical in the figure). The first light guides 32a extend in a first direction, and the second light guides 32b extend in a second direction different from the first direction and that intersects with the first direction so as to form a plurality of intersecting regions 38 at which one of the first light guides 32a intersects with one of the second light guides 32b. In the example of FIG. 4, the first and second directions are perpendicular to each other to form the square grid pattern depicted in the figure, but other intersecting first and second directions may be employed. In addition, in the illustrated example of FIG. 4, the first ends of the light guides having the light sources and the second ends of the light guides having the photodetectors, for each light guide set 32a/32b, are located on a same side of the shape sensor sensor 30. As an alternative, the light sources and photodetectors may be regularly or irregularly interspersed with each other with comparable performance, although a same side configuration may be easier to manufacture.

Figure 5:
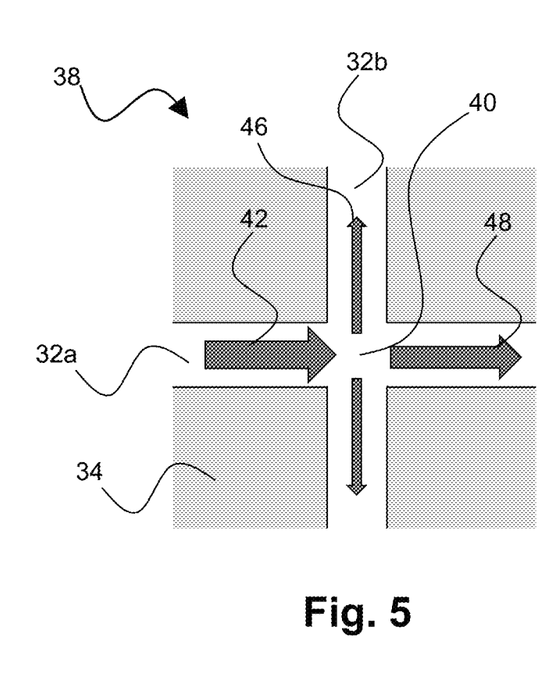
FIG. 5 is a drawing depicting a close-up view of an intersecting region of light guides in the shape sensor of FIG. 4.

FIG. 5 is a drawing depicting a close-up view of an intersecting region 38 of light guides in the shape sensor 30 of FIG. 4. In the intersecting region 38, a first light guide 32a intersects with a second light guide 32b, whereby an intersecting core region 40 is shared by both light guides. Accordingly, at the intersecting core region 40, there can be crosstalk of light transmission and travel between the first and second light guides whereby a portion of upstream light 42 relative to the intersecting core region 40 traveling within the first light guide 32a diverts into the second light guide 32b. In FIG. 5, this is illustrated by diverted light 46 traveling within the second light guide 32b, and downstream light 48 relative to the intersecting region 40 having a diminished intensity relative to the upstream light 42 (as exemplarily illustrated in the figure by the different arrow thicknesses).

Figure 6:
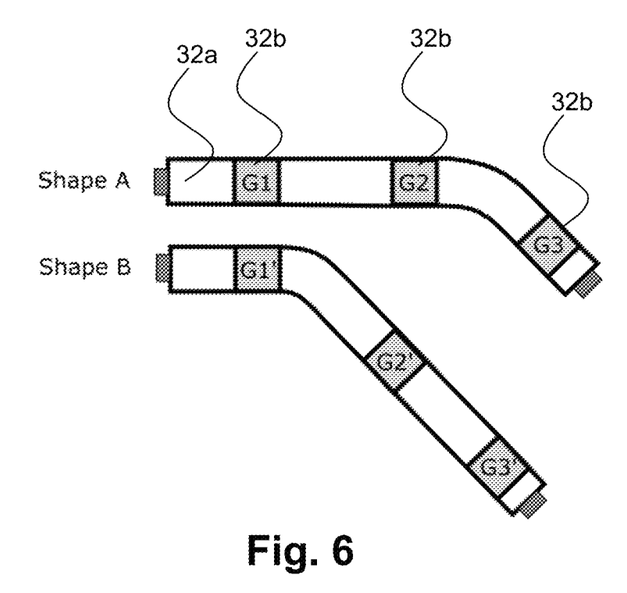
FIG. 6 is drawing depicting a portion of the optical shape sensor showing a first Shape A in a portion of the 2D lattice of light guides, and a second Shape B in the portion of the 2D lattice of light guides.

In contrast to the deficiencies described with respect to FIGS. 3A and 3B, the use of a 2D lattice of intersecting light guides permits a shape determination in addition to a degree of curvature determination. FIG. 6 is drawing depicting a portion of the optical shape sensor 30 showing a first Shape A in a portion of the 2D lattice of light guides, and a second Shape B in the portion of the 2D lattice of light guides. Shape A includes a first light guide 32a intersecting three second light guides 32b at intersecting core regions with positions identified by G1, G2, and G3. Shape B illustrates a different shape in which the first light guide 32a intersects the three second light guides with positions identified by G1', G2', and G3'.

Figure 7:
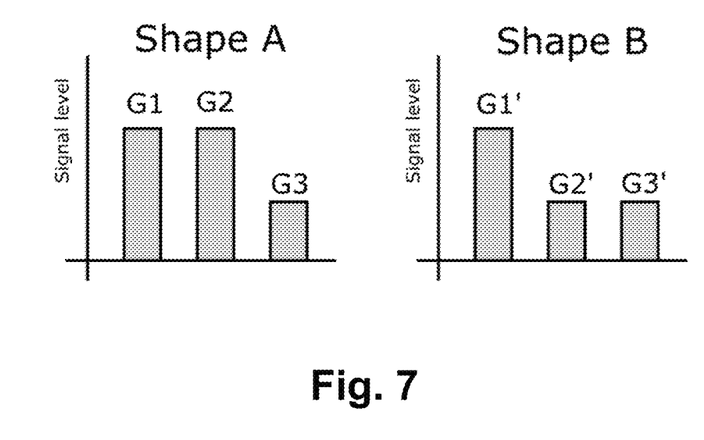
FIG. 7 is a graph depicting the relative light intensity signal levels that will be measured at the photodetectors corresponding to Shape A versus Shape B of FIG. 6.

As described above with respect to FIG. 3A, the light intensity measured at the photodetector 26 for the first light guide 32a will be the same for Shape A and Shape B, as the overall curvature is the same. In contrast, different light intensity signal levels will be measured at the photodetectors for the three second light guides 32b depending upon whether Shape A or Shape B is present. FIG. 7 is a graph depicting the relative signal levels that will be measured at the photodetectors for the three second light guides 32b for Shape A versus Shape B. When the light source 20 is switched on with the light guide 32a configured with Shape A, light intensity is measured at the photodetectors for the three second light guides 32b due to crosstalk at the intersecting regions G1, G2 and G3. Because light guide 32a is straight through G2, other than the crosstalk at the intersecting regions there is largely TIR within the light guide 32a through G2, and thus the light measured from the corresponding photodetectors associated with G1 and G2 is approximately the same. Following G2, however, the first light guide 32a is curved, and thus the light undergoes a frustrated TIR (FTIR) in that a portion of the light escapes from the light guide at the location of the curvature. As a result, the crosstalk at G3 is less than at G1 and G2, the thus the light intensity signal level measured from the corresponding photodetector associated with G3 is less than that measured from G1 and G2 as shown in FIG. 7 for Shape A. Based on such difference, a controller can determine that the light guide is curved between intersecting regions G2 and G3. In addition, by examining the ratio of the light intensity signal level measured at G2 to G3, the controller further can measure a radius of curvature or comparable indication of how much or the degree to which the light guide 32a is curved.

Similarly with respect to Shape B, the light guide 32a is straight through G1', and other than the crosstalk at the intersecting region G1' there is largely TIR within the light guide 32a through G1'. In this example, the curvature of the first light guide 32a is curved after G1', and thus the light undergoes FTIR in that a portion of the light escapes from the light guide at the location of the curvature. As a result, the crosstalk at G2' is less than at G1' as shown in FIG. 7 of Shape B, and the thus the light intensity signal level measured from the corresponding photodetector associated with G2' is less than that measured from G1'. In this example, after the curvature the light guide 32a remains straight through G3', and thus the remaining light will largely experience TIR through G3' aside from the crosstalk. Accordingly, for Shape B the light intensity signal level measured off of G2' and G3' will be approximately the same, which again is less that the light intensity signal measured off of G1'. Based on such difference, a controller can determine that the light guide is curved between intersecting regions G1' and G2'. In addition, by examining the ratio of the light intensity signal level measured at G1' to G2', the controller further can measure a radius of curvature or comparable indication of how much or the degree to which the light guide 32a is curved.

In this manner, the relative positions of curvature of the light guide 32a in Shape A versus Shape B can be determined precisely. It will be appreciated that although light guide 32a in the example of FIGS. 6 and 7 has only one curved region, comparable principles may be applied to detecting curvature and shape with multiple curves. More comprehensively, a 2D lattice of intersecting light-guides with optical crosstalk can detect and measure light guide shape of the various light guides. When such a 2D lattice is incorporated into the optical shape sensor 30, the various curvature and shape measurements may be combined by an electronic controller to determine the overall shape of the optical shape sensor 30.

Figure 8:
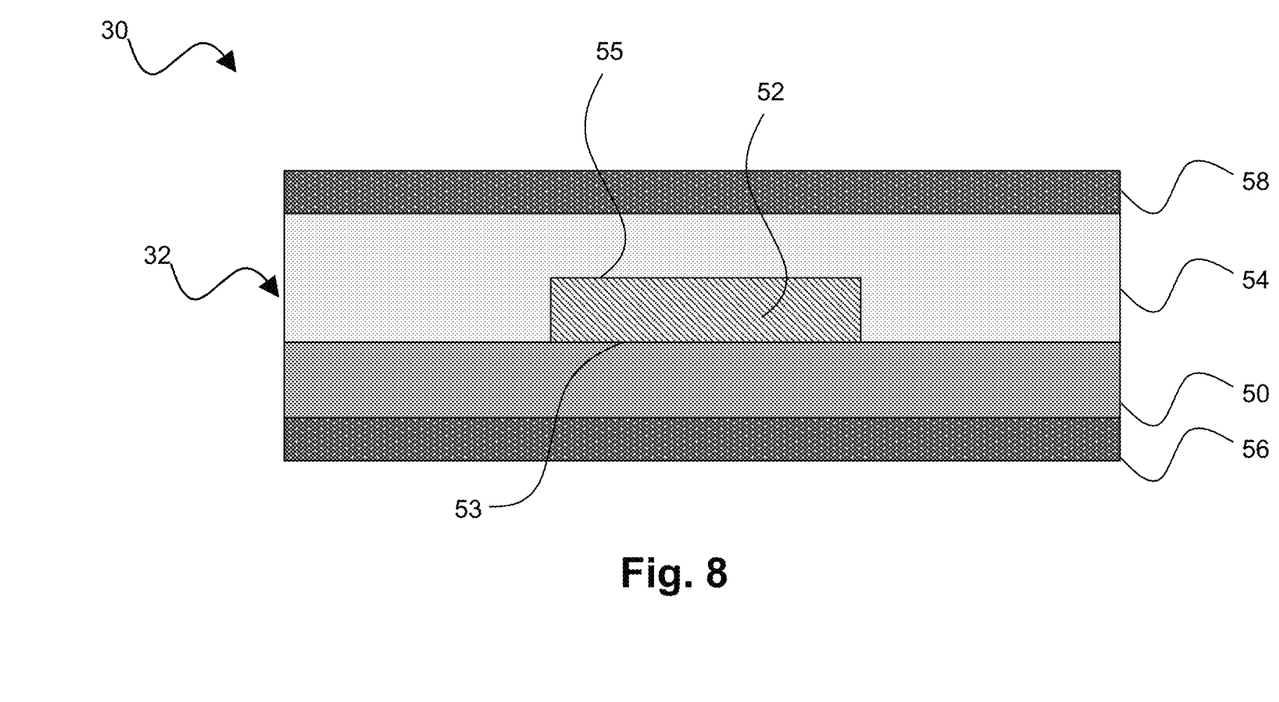
FIG. 8 is a drawing depicting a cross-sectional view of a portion of the optical shape sensor through one of the light guides.

FIG. 8 is a drawing depicting a cross-sectional view of a portion of the optical shape sensor 30 through one of the light guides 32. The optical shape sensor 30 has a flexible substrate 50 on which the light guide cores 52 are deposited, which preferably may be a transparent organic polymer layer, or may be a thin sheet of metal or other suitable flexible material. The flexible substrate 50 should be mechanically elastic for a prescribed range of bending, i.e. the substrate should recover its original shape when no forces are applied. The substrate may form part of the cladding material and thus should have a refractive index that is smaller than a refractive index of the core material 52 of the light guide 32. In exemplary embodiments, when the substrate is not transparent such as a metal sheet, or a metal coated plastic sheet, the substrate should be a reflective material, or have a reflective coating, to provide full reflection regardless of curvature for reasons described in more detail below.

The flexible core material 52 is a substance that is transparent to the wavelength(s) of light emitted from the light source, and as referenced above the refractive index of the core material 52 is greater than the refractive index of the cladding material. The core material also is flexible, and an organic polymer material is suitable for the core material. The core material 52 is embedded in a flexible filler cladding material 54 that is deposited on the substrate 50 and surrounds the light guide cores 52. The filler material suitably may be made of an organic polymer material that also is flexible and transparent. The filler material 54, as part of the cladding, has a refractive index that is smaller than the refractive material of the core material 52. The refractive index of the filler cladding material 54 may be the same as or different from the refractive index of the substrate material 50.

Various suitable materials may be employed as the core or cladding materials, with the material selection largely being based on the wavelength(s) of operation of the light sources. Accordingly, the core and at least one of the substrate or the filler material must be transparent to source wavelength(s) to have light transmission and to satisfy the TIR criterion. Example inorganic materials include silicate glasses (conventional or soda-lime glass), silica, metal fluorides (such as such as fluorozirconate or fluoroaluminate), chalcogenide glasses, and sapphire. Example organic materials include PMMA (poly-methylacrylate), polysiloxanes, polystyrene, PDDA (Polydiallyldimethylammonium chloride), PEI (Polyethylenimine). When the substrate or filler material are reflective or have a reflective coating, as further detailed below, a metal can be used as the reflective material, such as for example steel, aluminium, chrome, nickel, or silver. Example material combinations (with refractive indices in brackets where applicable) include: silica glass substrate (1.520), Polycarbonate (1.585) core, PEI (1.530) filler; and steel substrate (N/A), PMMA (1.49) core, PDDA (1.375) filler.

The sensor further may include a first absorber layer 56 on an outer surface of the substrate 50 and/or a second absorber layer 58 on an outer surface of the filler material 54. The first and second absorber layers may be made of the same material or different materials. The material of the absorber layers is selected to have high optical absorption at the wavelength(s) of light emitted by the light sources, and thus prevent outgoing light from re-entering the core material. Each light guide has a light source at one end, and a photodetector at the other as described above. The light sources typically may be light-emitting diodes (LEDs), and the photodetectors typically may be photo-diodes, including either inorganic photo-diodes (for example Si, aSi,) or organic photo-diodes such as P3HT:PCBM (P3HT stands for P3HT-Poly(3-hexylthiophene-2,5-diyl), and PCBM for Phenyl-C61-butyric acid methyl ester), or P3HT:PVK (PVK stands for Poly(9-vinylcarbazole)). LEDs and photodiodes can be grouped at opposite sides, or be mixed according to a pattern, or distributed arbitrarily along the edges of the shape sensor.

The optical shape sensor includes the flexible 2D lattice of light guides including a plurality of first light guides extending in a first direction and a plurality of second light guides that extend in a second direction that intersects with the first direction, so as to form a two-dimensional grid. The first and second directions may be perpendicular to each other. The light guide cores are diffusive, i.e. light may be scattered arbitrarily in any direction. Crosstalk at the intersecting core regions may be due to rays of light going from one light guide to a crossing one by virtue of internal reflections at certain angles, or crosstalk may be due to light diffusion. Light diffusion may occur at the interfaces between the core and the cladding materials when the surfaces at the interfaces are not perfectly specular. Defects or surface features can also be introduced at the surface interfaces intentionally to tune the diffusivity. Light diffusion also may occur in the bulk of the core material due to defects in the material, naturally occurring or artificially introduced (e.g. air bubbles, beads, or the like). Each light guide has a light source at a first end, and a photodetector at a second end opposite from the first end.

As described above with respect of FIG. 3B, one type of common curvature with different shape may be a curvature in different or opposing directions, such as a concave curvature versus a convex curvature of comparable degree. To distinguish different directions of curvature, an asymmetry of optical properties can be introduced between a first interface of the core 52 and the substrate 50, versus a second interface of the core 52 and the filler material 54. For example, in exemplary embodiments the substrate 50 and the filler material 54 have different refractive indices, and thus the TIR condition will differ at each interface. Accordingly, the amount of light escaping from a concave curvature will differ from the amount of light escaping from a convex curvature, and thus such difference can be used by the controller to determine a direction of curvature.

Referring back to FIG. 8, in another embodiment, a reflective surface may be provided at one or the other interface of the core/substrate interface 53 or the core/filler interface 55 with the light guide cores 52. The reflective surface 53 or 55 may be formed, for example, by coating one of the substrate or filler layers at the core interface 53 or 55 with a metal layer or other suitable reflective material. Accordingly, full reflection will always occur at the reflective surface interface regardless of curvature, whereas TIR versus FTIR will occur at the non-reflective interface based on the degree of curvature. Such difference also can be used by the controller to determine a direction of curvature.

Figure 9:
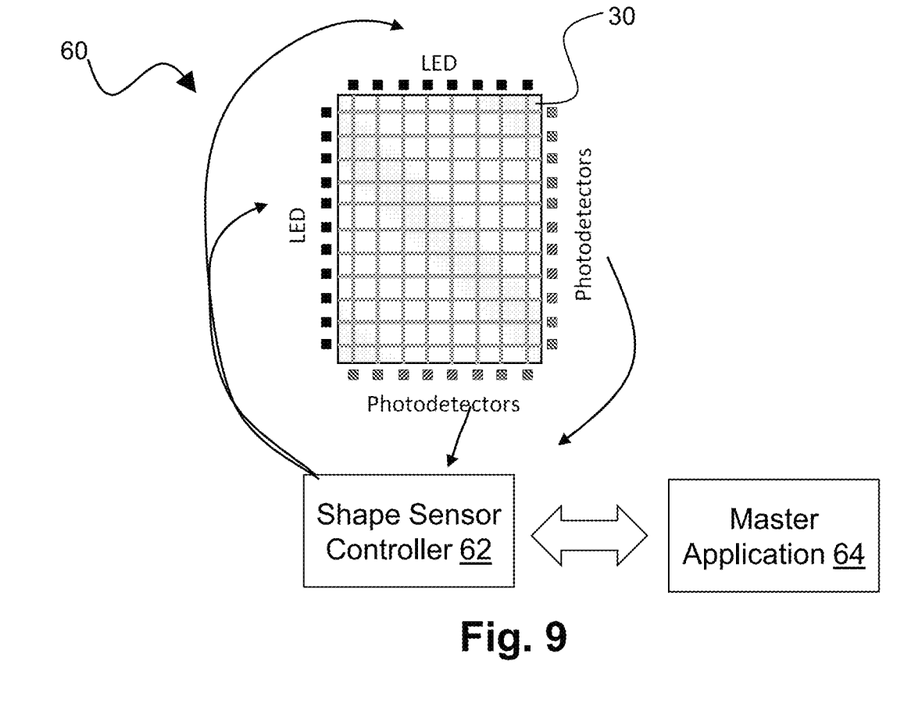
FIG. 9 is a drawing depicting an exemplary sensor system in accordance with embodiments of the present application.

FIG. 9 is a drawing depicting an exemplary sensor system 60 in accordance with embodiments of the present application. The sensor system 60 includes the shape sensor 30 connected in signal communication with a shape sensor controller 62. The shape sensor controller may be an electronic controller that employs a computer based architecture that is configured to transmit control signals to the shape sensor 30, and to receive and read output signals from the shape sensor 30, whereby the electronic controller further is configured to process the output signals to determine a shape or curvature of the shape sensor as described above.

The shape sensor controller, therefore, may include one or more processor devices that are configured to execute program code stored on a non-transitory computer readable medium associated with controlling the shape sensor, and processing output signals received from the shape sensor to determine the shape or curvature of the shape sensor. It will be apparent to a person having ordinary skill in the art of computer programming of electronic devices how to program the controller to operate and carry out logical functions associated with sensor system. Accordingly, details as to specific programming code have been left out for the sake of brevity. Also, controller functionality could be carried out via dedicated hardware, firmware, software, or any combinations thereof, without departing from the scope of the invention. As will be understood by one of ordinary skill in the art, therefore, the shape sensor controller may have various implementations. For example, the shape sensor controller may be configured as any suitable processor device, such as a programmable circuit, integrated circuit, memory and I/O circuits, an application specific integrated circuit, microcontroller, complex programmable logic device, other programmable circuits, or the like. The system may also include a non-transitory computer readable medium, such as random access memory (RAM), a read-only memory (ROM), an erasable programmable read-only memory (EPROM or Flash memory), or any other suitable medium. Instructions for operation of the shape sensor controller may be stored in the non-transitory computer readable medium and executed by the processor device(s).

The shape sensor controller 62 is configured to transmit excitation control signals that turn on and/or off a portion, up to all, of the light sources, to generate one or more illumination patterns. The illumination patterns as transmitted through the light guides are affected by the curvature of the cores of the light guides as detected by the photodetectors. The shape sensor controller 62 further is configured to receive the output of the light intensity signals from the corresponding photodetectors and extract or determine the shape or curvature of the shape sensor from such output signals as read by the controller. The excitation signals generated by the shape sensor controller that drive the light sources may be a DC signal, an input waveform, or a digital signal.

By processing the photodiode output signals that are read by the controller in response to stimulus from the light sources corresponding to different excitation illumination patterns, the shape sensor controller can calculate the shape or curvature of the sensor 30 using the principles described above. Such determination, therefore, encompasses a degree, positioning, and direction of any such curvature, permitting the detection of localized deviations and deflections that may be combined by the controller into an overall shape or curvature determination. The resolution or precision of the shape determination will be directly proportional to the number of rows and columns of light guides in the 2D lattice, and inversely proportional to their spacing. In other words, resolution or precision of the shape determination is increased with a larger number of light guides spaced closer together, and vice versa. Accordingly, there is a trade-off between complexity of structure in having more light guides versus precision or resolution of the shape determination.

The shape sensor controller further can exchange data and commands with an external master application 64. The master application 64 may be incorporated into a device that employs the sensor system 60, whereby operation of the device is dictated by the master application 64 in accordance with the determined shape or curvature of the shape sensor 30 by the shape sensor controller 62. Although the shape sensor controller and master application are illustrated as separate components, they may be integrated into a single component. The master application for controlling the associated device also may include processing devices and related program code stored on a non-transitory computer readable medium, which may be the same or different medium as the medium that stores the shape sensor controller instructions.

In an exemplary embodiment, the sensor system 60 is incorporated into a flexible display system, and the master application controls operation or interface of the flexible display system as part of a display substrate that include an image panel. For example, the shape of the shape sensor may correspond to a shape of a flexible display panel to provide a new interface for user input and/or for display output. For example, based on a determination of a deviation of the flexible display panel from a flat plane using the sensor system, certain display interface commands may become available, or certain specialized display modes may be initiated, in response to the determined deviation.

Figure 10:
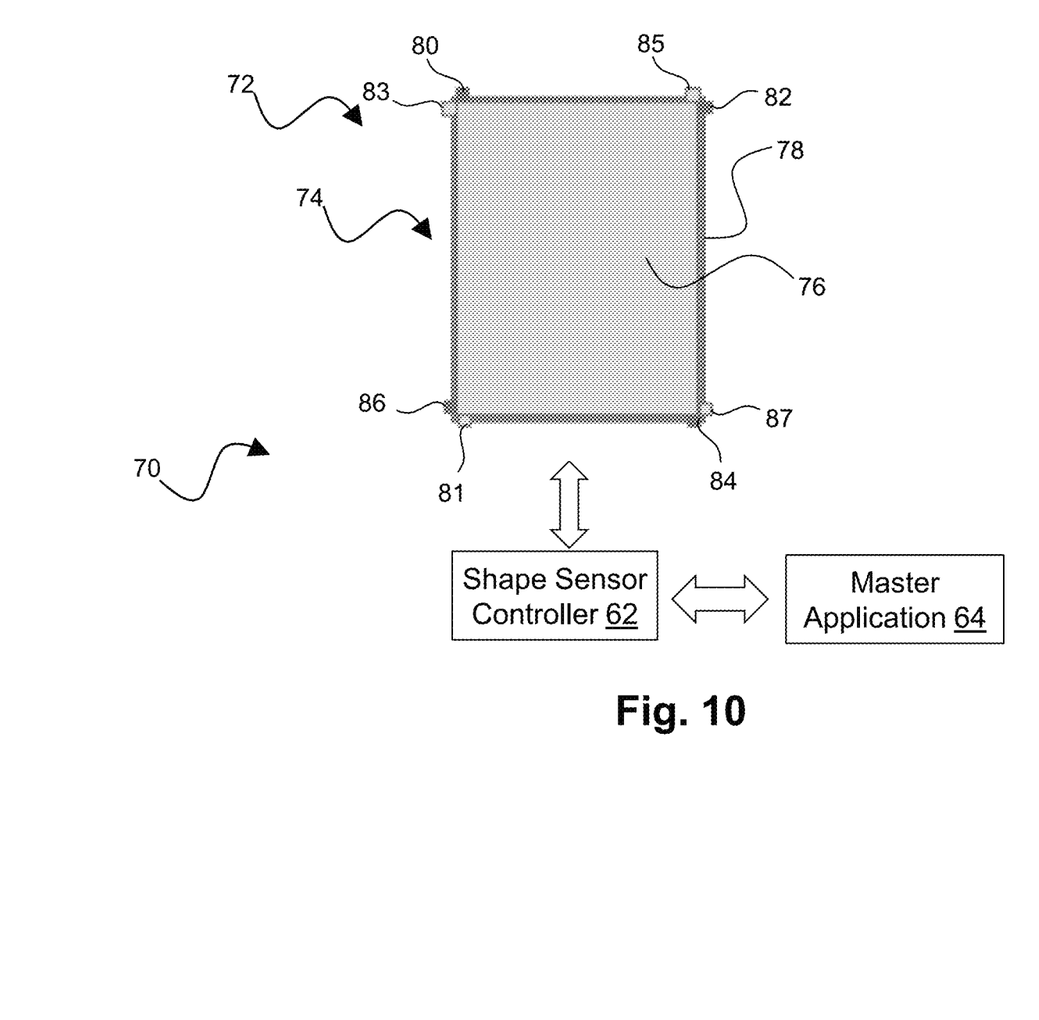
FIG. 10 is a drawing depicting another exemplary sensor system having an alternative optical shape sensor in accordance with embodiments of the present application.

FIG. 10 is a drawing depicting another exemplary sensor system 70 having an alternative optical shape sensor 72 in accordance with embodiments of the present application. As referenced above, the resolution or precision of the shape determination will be directly proportional to the number of rows and columns of light guides in the 2D lattice, and inversely proportional to their spacing. In other words, resolution is increased with a larger number of light guides spaced closer together. Taken to an extreme condition in which light guide cores are spaced ever closer and closer together, ultimately the "grid" pattern of light guide cores coalesces into a continuous slab of light guide core material. Such a continuous-slab light guide embodiment is illustrated in FIG. 10. In other exemplary embodiments, therefore, the shape sensor includes a flexible continuous-slab light guide having a continuous core material; a flexible cladding substrate that surrounds the continuous core material, wherein a refractive index of the continuous core material is greater than a refractive index of the cladding substrate; a plurality of light sources; and a plurality of photodetectors. The plurality of light sources and the plurality of photodetectors respectively are located on opposite sides of the continuous core material.

In the example of FIG. 10, the optical shape sensor 72 includes a continuous-slab light guide 74 having a continuous core material 76. The core material 76 is surrounded by a cladding substrate 78 that results in TIR and FTIR based upon bending axes imposed on the core material 76. In this example, light sources 80, 82, 84, and 86 are provided adjacent to respective corners of the core material 76. In FIG. 10, each light source is paired with a respective opposing photodetector 81, 83, 85, and 87 positioned on an opposite side of the core material 76 relative to the corresponding light source. Such a configuration employs fewer light sources and photodetectors as compared to previous embodiments, and thus provides for a simpler physical design. The trade-off against having fewer light sources and photodetectors is that a more complex algorithm is employed to detect bending axes of the continuous-slab core material. In other embodiments, there may be different numbers of light sources and photodetectors, which may be positioned at other locations and/or with other configurations other than opposite to each other.

Similarly as the previous embodiment, the sensor system 70 includes a shape sensor controller 62 that communicates with a master application 64. Different combinations of the light sources in the on state create specific illumination patterns, and the transmission of light from the illumination patterns is affected by the curvature of the core material as detected by the photodetectors. Some light is lost at locations at which the continuous-slab light guide is bent or curved, which alters the light intensity signals detected at the photodetectors. Accordingly, the shape sensor controller 62 is configured to control the light sources to emit light in different patterns of on/off states, and the resulting output signals are received by the shape sensor controller 62 from the photodetectors. By analyzing the output of the photodetectors for each pattern of light source states, the controller 62 extracts or determines the shape or curvature of the shape sensor 72. Although the example of FIG. 10 employs four opposing light source/photodetector pairs located adjacent to the corners of the core material 76, additional opposing light source/photodetector pairs may be provided along the sides of the core material. Adding opposing light source/photodetector pairs renders the physical construction more complex, but can simplify the shape determination algorithm by increasing the number of potential illumination patterns.

Figure 11A:
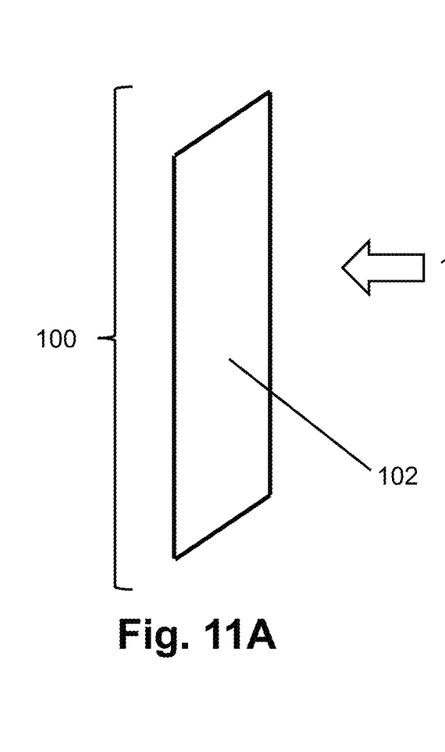
FIG. 11A is a drawing depicting an exemplary flexible substrate in accordance with embodiments of the present application, in a first or planar state.
Figure 11B:
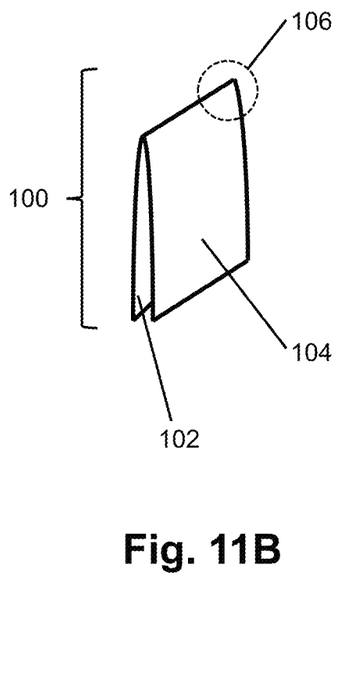
FIG. 11B is a schematic drawing depicting the exemplary flexible substrate of FIG. 11A in a non-planar state, in which the non-planar state is a folded state.
Figure 11C:
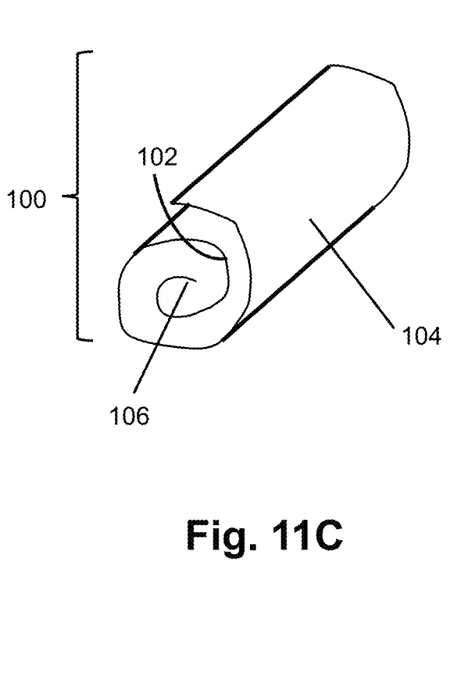
FIG. 11C is a schematic drawing depicting the exemplary flexible substrate of FIG. 11A in a non-planar state in which the non-planar state is a rolled state.

As referenced above, in an exemplary embodiment, the shape sensor systems of the present application may be incorporated into a flexible display system, and the master application controls operation or interface of the flexible display system based on the determined shape of the optical shape sensor. The optical shape sensor may be incorporated into a flexible display panel with the operation of the system being based on the determined shape. For example, the shape sensor shape may correspond to a shape of a flexible display panel to provide a new interface for user input and/or for display output. FIGS. 11A, 11B, and 11C are drawings illustrating how an exemplary flexible display substrate 100, which may include an optical shape sensor and shape sensor system according to any of the embodiments, wherein the flexible display substrate 100 may be reconfigured between a first or planar state and a second or non-planar planar state, such as being bent, folded, roller, curved, or otherwise flexed.

Referring first to FIGS. 11A and 11B, the flexible display substrate 100 comprises a flexible substrate including an image panel has a first side 102 and a second side 104 opposite from the first side (the second side is not visible from the viewpoint of FIG. 11A). The first side 102 may be a viewing side relative to the viewing direction 18, and the second side 104 may be a non-viewing side, or vice versa, or the display system may include multiple display panels that are differently viewable from different viewing sides. Generally, the flexible display substrate 100 can be repeatedly transformed between a first or planar state and a second or non-planar state. In a first type of transformation, FIG. 11A illustrates the display substrate in a first state corresponding to a planar state in which the entire flexible display substrate 100 is essentially straight. The flexible display substrate 100 may be reconfigured to a second state as illustrated in FIG. 11B, in which the flexible display substrate in this example essentially is folded. In the second state, the first side 102 constitutes an inner side and the second side 104 constitutes an outer side. The flexible display substrate 100 also may be reconfigured to intermediate states corresponding to different degrees of folding between the first state of FIG. 11A and the second state of FIG. 11B. In exemplary embodiments, the second state of the flexible display substrate 100 has at least one spatial region 106 that has a minimum radius of curvature that is less than 10 mm. In other embodiments, the flexible display system can be folded along multiple axes or in multiple directions.

FIG. 11C illustrates how the flexible display substrate 100 may be reconfigured between a first or planar state and a second or non-planar planar state corresponding essentially to rolled state. In the second or rolled state, the first side 102 also constitutes an inner side and the second side 104 also constitutes an outer side. Similarly as in folded embodiments, in exemplary rolled embodiments the first side 102 may be the viewing side 18 and second side 104 may be the non-viewing side or vice versa, or the display substrate may include multiple display panels that are differently viewable from different viewing sides depending the direction of rolling. The flexible display substrate 100 also may be reconfigured to intermediate states corresponding to different degrees of rolling between the first state of FIG. 11A and the second state of FIG. 11C. Similarly as in folded embodiments, in exemplary rolled embodiments the second (rolled) state of the flexible display substrate 100 has at least one spatial region 106 that has a minimum radius of curvature that is less than 10 mm. It will also be appreciated that other forms of flexing may be used, such as for example, tri-folding or other multiple folds, asymmetrical or slanted axis folding, rolling from a corner, or others types of bending, flexing, curving, or rolling as may be suitable for any particular usage or like application.

By enabling reconfiguration from a planar state to a non-planar state, images are viewable in the folded or rolled state which may provide unique viewing modes, such as for example being able to view images from both sides of the display system, or the use of different types of interface commands. Switching between the different modes may be based on the determined shape of the flexible display substrate, whereby the flexible display substrate includes an optical shape sensor in accordance with any of the embodiments that permits determination of the shape or curvature of the flexible display substrate 100. In addition, the optical shape sensor and broader sensor system (including a shape sensor controller that communicates with a master application) may be employed in any suitable device or system in which it is desirable to determine a shape or curvature of a flexible component.

An aspect of the invention, therefore, is a shape sensor that employs light guide technology to determine a degree, positioning, and direction of curvature of a flexible substrate to which the shape sensor is applied. In exemplary embodiments, the shape sensor includes a flexible two-dimensional lattice of a plurality of first light guides that extend in a first direction and a plurality of second light guides that extend in a second direction that intersects with the first direction; each of the light guides of the two-dimensional lattice including a light source at a first end of the light guide and a photodetector at a second end of the light guide opposite from the first end; and a flexible cladding material in which the two-dimensional lattice of first and second light guides is embedded. Each of the light guides of the two-dimensional lattice includes a core having a refractive index that is greater than a refractive index of the cladding material, and the first light guides and the second light guides intersect at intersecting core regions at which crosstalk of light travel occurs between the first light guides and the second light guides. The shape sensor may include one or more of the following features, either individually or in combination.

In an exemplary embodiment of the shape sensor, the cladding material includes a substrate on which the light guide cores are deposited, and a filler material that is deposited on the substrate and surrounds the light guide cores.

In an exemplary embodiment of the shape sensor, the substrate and the filler material have different refractive indexes.

In an exemplary embodiment of the shape sensor, one of a core/substrate interface or a core/filler interface with the light guide cores comprises a reflective surface.

In an exemplary embodiment of the shape sensor, the reflective surface comprises a reflective metal layer.

In an exemplary embodiment of the shape sensor, the shape sensor further includes a first absorber layer on an outer surface of the substrate that has an optical absorption for a wavelength of light emitted by the light sources.

In an exemplary embodiment of the shape sensor, the shape sensor further includes a second absorber layer on an outer surface of the filler material that has an optical absorption for a wavelength of light emitted by the light sources.

In an exemplary embodiment of the shape sensor, first and second absorber layers are made of the same material.

In an exemplary embodiment of the shape sensor, the first direction and the second direction are perpendicular to each other.

In an exemplary embodiment of the shape sensor, the first ends having the light sources and the second ends having the photodetectors respectively are located on same sides of the shape sensor.

In an exemplary embodiment of the shape sensor, the light sources are light-emitting diodes.

In an exemplary embodiment of the shape sensor, the photodetectors are photo-diodes.

In an exemplary embodiment of the shape sensor, the cladding material and/or the core material includes an organic polymer that is transparent to a wavelength of light emitted by the light sources.

In an exemplary embodiment of the shape sensor, the cladding material and/or the core material includes an inorganic material that is transparent to a wavelength of light emitted by the light sources.

In an exemplary embodiment of the shape sensor, the shape sensor includes a flexible continuous-slab light guide having a continuous core material; a flexible cladding substrate that surrounds the continuous core material, wherein a refractive index of the continuous core material is greater than a refractive index of the cladding substrate; a plurality of light sources; and a plurality of photodetectors, wherein the plurality of light sources and the plurality of photodetectors respectively are located on opposite sides of the continuous core material. The plurality of light sources and the plurality of photodetectors may include multiple opposing light source/photodetector pairs located adjacent to corners of the core material. Alternatively, the plurality of light sources and the plurality of photodetectors are not paired and are disposed at independent positions along an edge of the continuous core material.

Another aspect of the invention is a sensor system that includes a shape sensor according to any of the embodiments, and a controller that is connected in signal communication with the shape sensor. The controller is configured to transmit excitation control signals to the light sources and read output signals from the photodetectors, wherein the controller further is configured to determine a curvature of the shape sensor based on the output signals read from the photodetectors. The sensor system further may include a master application that is in signal communication with the controller, wherein the master application is configured to control a device in accordance with the determined curvature of the shape sensor by the controller.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present application relate to configurations and operation of devices with a flexible substrate in which the spatial configuration may be used to interact with a device. Examples of such devices include flexible display devices such as flexible mobile phones including smartphones, personal digital assistants (PDAs), tablets, laptop computers, public information displays, industrial controls, and the like.

REFERENCE SIGNS LIST

10—light-guide
12—core material
14—cladding material
16—light rays
18—core/cladding interface
20—light source
22—first end of light guide
24—second end of light guide
26—photodetector
28—escaping light rays
30—optical shape sensor
32—intersecting light guides
32a—first light guides
32b—second light guides
34—cladding material
36—light source
37—photodetector
38—intersecting regions
40—intersecting core region
42—upstream light
46—diverted light
48—downstream light
50—flexible substrate
52—light guide cores
53—core/substrate interface
54—filler cladding material
55—core/filler interface
56—first absorber layer
58—second absorber layer
60—sensor system
62—shape sensor controller
64—external master application
70—sensor system
72—optical shape sensor
74—continuous-slab light guide
76—continuous core material
78—cladding substrate
80—light source
81—photodetector
82—light source
83—photodetector
84—light source
85—photodetector
86—light source
87—photodetector
100—flexible display substrate
102—first side of display substrate
104—second side of display substrate
106—spatial region of curvature
n1—first refractive index
n2—second refractive index

What is claimed is:

1. A shape sensor comprising:
a flexible two-dimensional lattice of a plurality of first light guides that extend in a first direction and a plurality of second light guides that extend in a second direction that intersects with the first direction;
each of the light guides of the two-dimensional lattice including a light source at a first end of the light guide and a photodetector at a second end of the light guide opposite from the first end; and
a flexible cladding material in which the two-dimensional lattice of first and second light guides is embedded;
wherein each of the light guides of the two-dimensional lattice includes a core having a refractive index that is greater than a refractive index of the cladding material; and
wherein the first light guides and the second light guides intersect at intersecting core regions at which crosstalk of light travel occurs between the first light guides and the second light guides.

2. The shape sensor of claim 1, wherein the cladding material includes a substrate on which the light guide cores are deposited, and a filler material that is deposited on the substrate and surrounds the light guide cores.

3. The shape sensor of claim 2, wherein the substrate and the filler material have different refractive indexes.

4. The shape sensor of claim 2, wherein one of a core/substrate interface or a core/filler interface with the light guide cores comprises a reflective surface.

5. The shape sensor of claim 4, wherein the reflective surface comprises a reflective metal layer.

6. The shape sensor of claim 2, further comprising an absorber layer on an outer surface of the substrate that has an optical absorption for a wavelength of light emitted by the light sources.

7. The shape sensor of claim 2, further comprising an absorber layer on an outer surface of the filler material that has an optical absorption for a wavelength of light emitted by the light sources.

8. The shape sensor of claim 2, further comprising a first absorber layer on an outer surface of the substrate that has optical absorption for a wavelength of light emitted by the light sources, and a second absorber layer on an outer surface of the filler material that has optical absorption for a wavelength of light emitted by the light sources;
wherein first and second absorber layers are made of the same material.

9. The shape sensor of claim 1, wherein the first direction and the second direction are perpendicular to each other.

10. The shape sensor of claim 1, wherein the first ends having the light sources and the second ends having the photodetectors respectively are located on same sides of the shape sensor.

11. The shape sensor of claim 1, wherein the light sources are light-emitting diodes.

12. The shape sensor of claim 1, wherein the photodetectors are photo-diodes.

13. The shape sensor of claim 1, wherein the cladding material and/or the core material includes an organic polymer that is transparent to a wavelength of light emitted by the light sources.

14. The shape sensor of claim 1, wherein the cladding material and/or the core material includes an inorganic material that is transparent to a wavelength of light emitted by the light sources.

15. A sensor system comprising:
a shape sensor according to claim 1; and
a controller that is connected in signal communication with the shape sensor and that is configured to transmit excitation control signals to the light sources and read output signals from the photodetectors, wherein the controller further is configured to determine a curvature of the shape sensor based on the output signals read from the photodetectors.

16. The sensor system of claim 15, further comprising a master application that is in signal communication with the controller, wherein the master application is configured to control a device in accordance with the determined curvature of the shape sensor by the controller.

17. A shape sensor comprising:
 a flexible continuous-slab light guide having a continuous core material;
 a flexible cladding substrate that surrounds the continuous core material, wherein a refractive index of the continuous core material is greater than a refractive index of the cladding substrate;
 a plurality of light sources; and
 a plurality of photodetectors, wherein the plurality of light sources and the plurality of photodetectors respectively are located on opposite sides of the continuous core material.

18. The shape sensor of claim 17, wherein the plurality of light sources and the plurality of photodetectors are not paired and are disposed at independent positions along an edge of the continuous core material.

19. A sensor system comprising:
 a shape sensor according to claim 17; and
 a controller that is connected in signal communication with the shape sensor and that is configured to transmit excitation control signals to the light sources and read output signals from the photodetectors, wherein the controller further is configured to determine a curvature of the shape sensor based on the output signals read from the photodetectors.

20. The sensor system of claim 19, further comprising a master application that is in signal communication with the controller, wherein the master application is configured to control a device in accordance with the determined curvature of the shape sensor by the controller.

* * * * *